(12) United States Patent
Kobayashi

(10) Patent No.: US 7,866,826 B2
(45) Date of Patent: Jan. 11, 2011

(54) IMAGE PROJECTOR AND METHOD AND PROGRAM FOR CONTROLLING THE OPERATION OF THE PROJECTOR

(75) Inventor: Keiichi Kobayashi, Higashiyamato (JP)

(73) Assignee: Casio Computer Co., Ltd., Tokyo (JP)

( * ) Notice: Subject to any disclaimer, the term of this patent is extended or adjusted under 35 U.S.C. 154(b) by 357 days.

(21) Appl. No.: 12/141,142

(22) Filed: Jun. 18, 2008

(65) Prior Publication Data

US 2008/0316435 A1 Dec. 25, 2008

(30) Foreign Application Priority Data

Jun. 20, 2007 (JP) ............... 2007-162611

(51) Int. Cl.
G03B 21/00 (2006.01)
G03B 21/16 (2006.01)
(52) U.S. Cl. .......................... 353/52; 353/85
(58) Field of Classification Search ........... 353/52, 353/54, 57, 58, 59, 60, 61, 85, 30; 348/748
See application file for complete search history.

(56) References Cited

U.S. PATENT DOCUMENTS

| | | | |
|---|---|---|---|
| 6,472,828 B1 * | 10/2002 | Pruett et al. ........... | 315/225 |
| 6,886,942 B2 * | 5/2005 | Okada et al. ........... | 353/52 |
| 7,258,446 B2 | 8/2007 | Jayaram et al. | |
| 2003/0020884 A1 * | 1/2003 | Okada et al. ........... | 353/57 |
| 2006/0164602 A1 | 7/2006 | Jayaram et al. | |
| 2008/0316435 A1 * | 12/2008 | Kobayashi ........... | 353/52 |
| 2009/0033879 A1 * | 2/2009 | Saito ........... | 353/52 |
| 2009/0101828 A1 * | 4/2009 | Nakata et al. ........... | 250/370.15 |

FOREIGN PATENT DOCUMENTS

| | | |
|---|---|---|
| CN | 1811587 A | 8/2006 |
| JP | 2004-021103 A | 1/2004 |
| JP | 2005-156750 A | 6/2005 |
| JP | 2005-227537 A | 8/2005 |

OTHER PUBLICATIONS

Japanese Office Action dated Apr. 14, 2009 (3 pages), and English translation thereof (4 pages), issued in counterpart Japanese Application Serial No. 2007-162611.
Japanese Office Action dated Jun. 30, 2009, issued in counterpart Japanese Patent Application No. 2007-162611, and English translation thereof.
Chinese Office Action dated Jun. 12, 2009 and English translation thereof issued in counterpart Chinese Application No. 2008101097973.

* cited by examiner

*Primary Examiner*—John R Lee
(74) *Attorney, Agent, or Firm*—Holtz, Holtz, Goodman & Chick, PC

(57) ABSTRACT

An image projector apparatus comprising a cooler (24) having a variable capability to cool a light source (18), commanding means (29) which gives a command to terminate a lightening operation of the light source, selecting means (29) responsive to the command given by the projection light processor for selecting a cooling capability of the cooler, and control means (29) for causing the cooler to cool the light source with the cooling capability selected by the selecting means.

5 Claims, 5 Drawing Sheets

IMAGE PROJECTOR AND METHOD AND PROGRAM FOR CONTROLLING THE OPERATION OF THE PROJECTOR

BACKGROUND OF THE INVENTION

1. Field of the Invention

The present invention relates to image projectors and more particularly to such projector using especially a light source such as a high-pressure mercury lamp, and a method and program for controlling the operation of the projector.

2. Description of the Related Art

An image projector is proposed which cools its light source to a predetermined temperature after terminating an image projection event, as disclosed, for example, in Japanese Published Unexamined Patent Application 2005-156750. This projector is constituted so as to increase the rotational speed of a cooling fun thereof automatically after terminating its image projection event, thereby cooling the lamp quickly in as short time as possible.

In an actual environment where the projector is set up, participants in the image projection event can hold a discussion or briefing about the projected image after the image projection event is terminated. If in such a case the projector is cooled quickly to move the projector away out of the environment, great noise would be produced, thereby hampering the discussion or briefing.

It is therefore an object of the present invention to provide an image projector in which after terminating its image projection event the to light source is cooled in a manner appropriate for the environment of the projector such that noise produced by the projector is reduced low enough not to hamper the discussion or briefing. It is another object of the present invention to provide a method and program for controlling the cooling operation of the light source of the projector so as not to produce great noise after terminating its image projection event.

SUMMARY OF THE INVENTION

In order to achieve the above object, the present invention provides an image projector apparatus comprising a light source; a projector subunit that produces an optical image based on an image signal and light from the light source and projects the optical image; a cooler having a variable capability to cool the light source after the light source is turned off; commanding means for giving a command to terminate the lightening operation of the light source; selecting means responsive to the command given by the commanding means for selecting a cooling capability of the cooler; and control means for causing the cooler to cool the light source with the cooling capability selected by the selecting means.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present a invention in which.

DETAILED DESCRIPTION OF THE PREFERRED EMBODIMENTS

First Embodiment

An image projector 10 of a DLP™ (Digital Light Processing) type according to the first embodiment of the present invention will be described with respect to the accompanying drawings.

Figure 1:
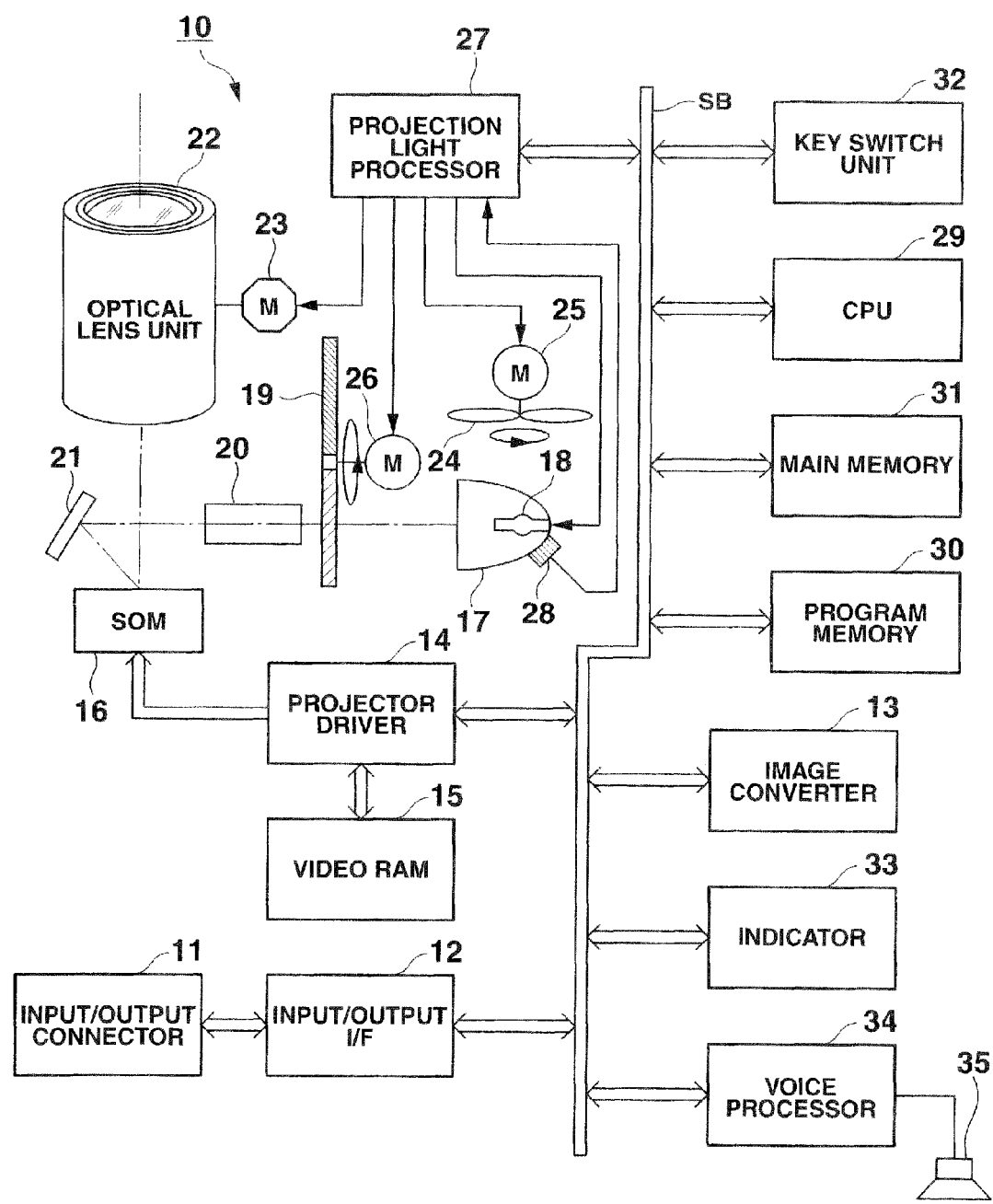
FIG. 1 is a block diagram of a circuit configuration of an image projector according to a first embodiment of the present invention.

Referring to FIG. 1, there is shown the functional configuration of an electronic circuit of the projector 10 according to the first embodiment. In FIG. 1, an input/output connector 11 comprises, for example, video input terminals of a pin/jack (RCA) type, RGB input terminals and USB terminals.

Various standardized image signals inputted from the input/output connector 11 to the projector 1 are converted by an image converter 13 to image signals of a predetermined format through an input/output interface (I/F) 12 and a system bus SB. These image signals are then forwarded to a projection driver 14. In this case, a mode image for an OSD (On-Screen Display) and symbols such as a pointer are forwarded carried on the image signal to the projection driver 14, as required.

The projection driver 14 loads and stores the received image on and in a video RAM 15, and then produces a video signal from the image stored in the RAM 15. For displaying purposes, the projection driver 14 drives a spatial optical modulator (SOM) such as a micro-mirror device 16 in a high-speed time-divisional manner based on a product of a frame rate of the video signal, for example, of 60 frames/sec, the number of color components and a display grey scale number.

A light source comprising, for example, a very high-pressure mercury lamp 18, disposed within a reflector 17 emits high-brightness white light, which is then colored sequentially in three (for example, red, green and blue) primary colors in a time-divisional manner through a color wheel 19, changed to a light flux of uniform brightness distribution by an integrator 20, wholly reflected by a mirror 21 and then applied to the micro-mirror device 16.

The reflected light from the micro-mirror 163 forms an optical image, which is then projected onto a screen (not shown) through an optical lens unit 22 which has an image enlarging function. The optical lens unit 22 has a variable focal position and a variable zoom position (or projection angle of view). More particularly, a focus lens and a zoom lens (both not shown) of the optical lens unit 22 are controlled so as to be movable along an optical axis by a stepping motor (M) 23.

A cooling fan 24 which cools the light source 18 is driven by a motor (M) 25 which is driven at a selected one of "high", "medium" and "low" rotational speeds. The color wheel 19 is driven by a motor (M) 26.

A projection light processor 27 controls the driving of the stepping motor 23, the lighting-up operation of the light source 18, and the driving of the motor 26 for the color wheel 19 and of the motor 25 for the cooling fan 24. The projection light processor 27 also receives temperature data from a temperature sensor 28 which senses the temperature of the light source 18 attached to the reflector 17.

A CPU 29 controls all those circuits of the projector 10, using a non-volatile program memory 30 which has stored an operation program and various definite data and a main memory including a RAM 31. The CPU 29 is connected through the system bus SB to a key switch unit 32, an indicator 33 and a voice processor 34

Figure 2:
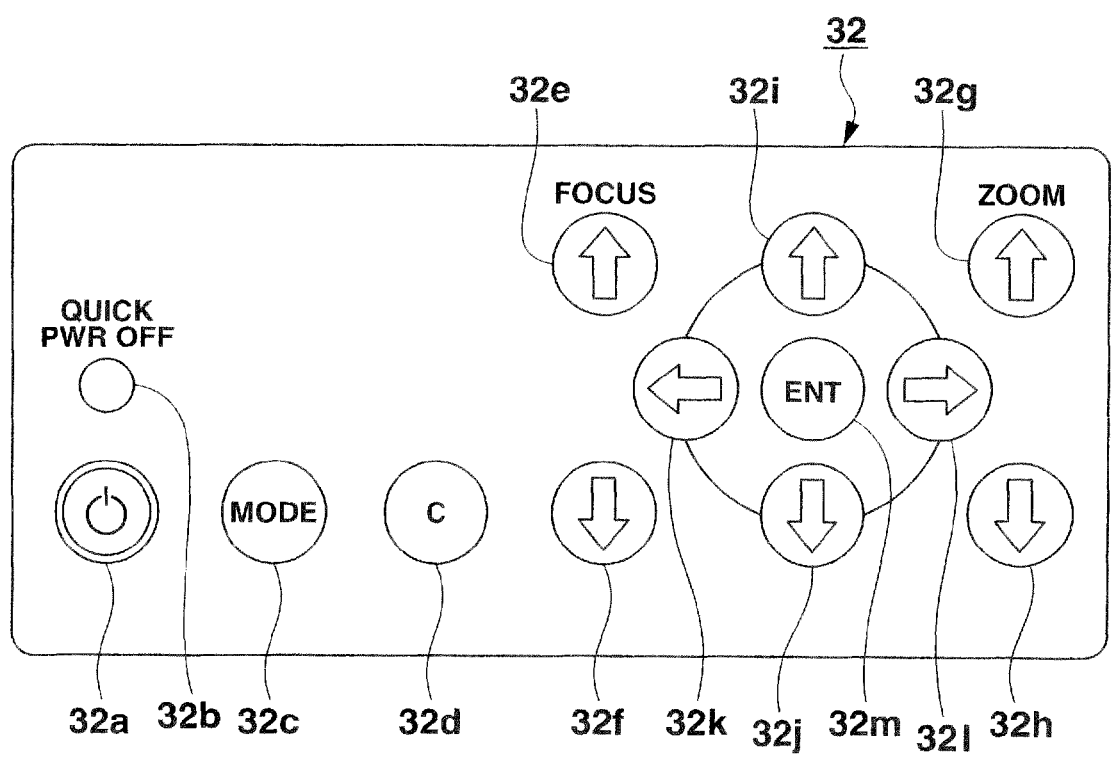
FIG. 2 is an illustration of the composition of a key switch unit of the projector.

FIG. 2 illustrates the composition of the key switch unit 32 disposed, for example, on an upper surface of a housing of the projector 10. The key switch unit 32 comprises a power supply key 32a, a quick power off key 32b, a mode key 32c, a cancel (C) key 32d, focus keys 32e, 32f, zoom keys 32g, 32h, cursor keys "↑", "↓", "←" and "→" 32i-32l, and an enter key 32m.

When operated, the power supply key 32a gives a command to turn on/off the power supply. When operated, the quick power off key 32b gives a command to turn off the power supply, thereby causing quick cooling of the light source 18 after terminating the image projection. When operated sequentially a predetermined number of times, the mode key 32c sequentially gives a like number of different commands to set corresponding operation modes in a cycle. When operated, the cancel (C) key 32d gives a restore command to cancel a current operational state and restore the previous operational state. When operated, the focus keys 32e and 32f give commands to move the focus lens in one and the other direction, respectively, along the optical axis. When operated, the zoom keys 32g and 32h give commands to increase and decrease, respectively, the angle of view of the zoom lens. When operated, one of the cursor keys 32i-32l gives a command to move an item selected at that time in a corresponding direction. When operated, the enter key 32m gives a command to fix an item selected at that time.

When any one of these keys of the key switch unit 32 is depressed by the user, a corresponding operation signal is forwarded to the CPU 29, which in turn performs a corresponding control operation.

The indicator 33 is composed, for example, of a plurality of LEDs to display various operation states of the projector and an abnormal temperature of the light source 18 in corresponding lightening colors and corresponding flashing patterns.

The voice processor 34 comprises a sound circuit such as a PCM sound source which converts voice data given at a time of image projection to analog data, which is then amplified and emanated as a voice or peep sound by a speaker 35 attached, for example, to a back of the projector 10 casing.

Figure 3:
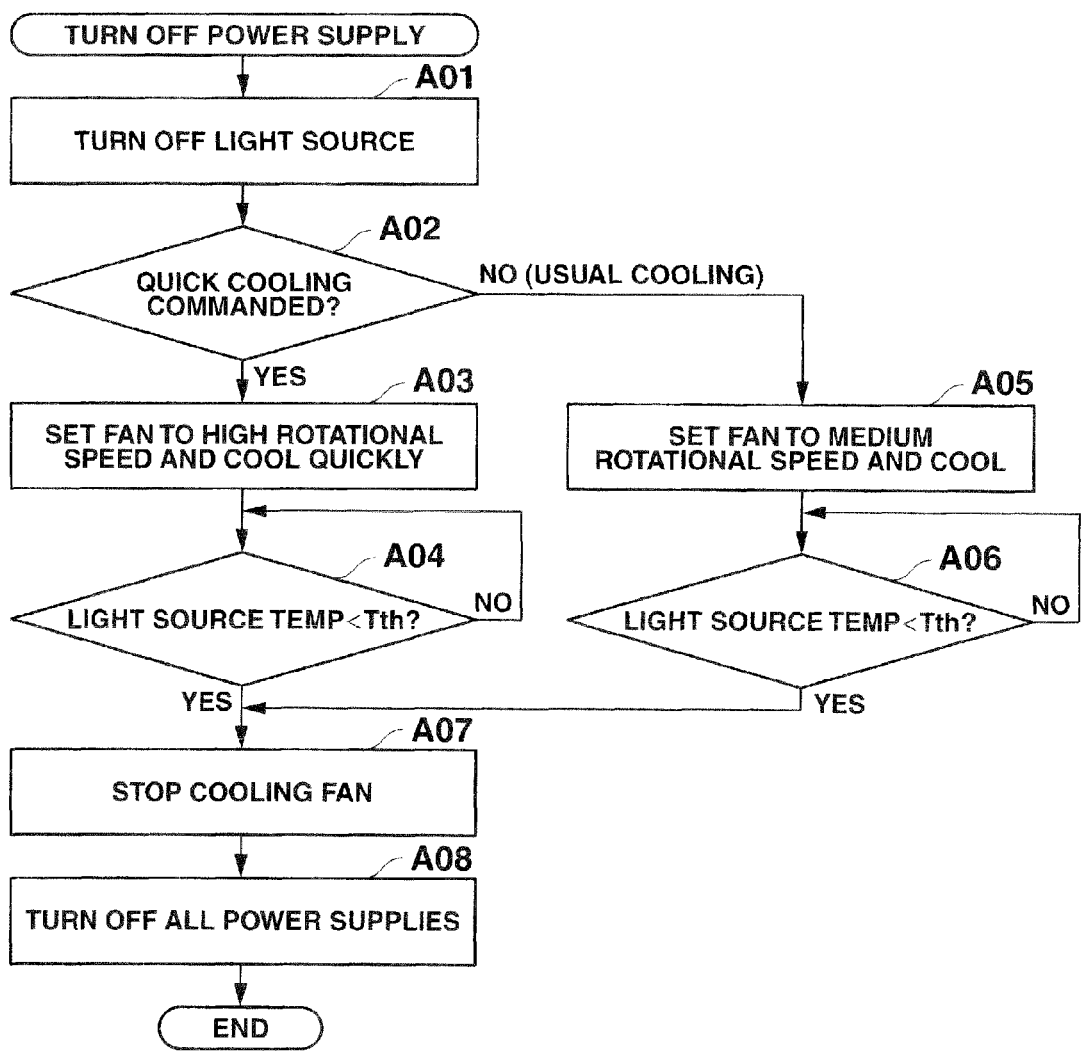
FIG. 3 is a flowchart of operation of the projector to be performed when its power supply is turned off.

Operation of the embodiment will be described. FIG. 3 is a flowchart of operation of the projector to be performed when a command to turn off the power supply of the projector is given by the power supply key 32a or by the quick power off key 32 of the key switch unit 32. This operation is performed by the CPU 29 mainly via the projection light processor 27 based on the operation program stored in the program memory 30.

At the beginning the lightening operation of the light source 18 is stopped and the light source 18 is turned off (step A01). Then whether the quick cooling for the light source 18 is required is determined depending on whether the turn-off command for the lamp 18 is given by operation of the quick power off key 32b (step A02).

If it is determined that the quick cooling for the light source 18 is required (step A02), the motor 25 is set to the highest "high" one of the "high", "medium" and "low" rotational speeds, thereby cooling the lamp 18 quickly (step A03).

Then it is determined based on a sensed temperature of the light source 18 from the temperature sensor 28 whether the light source 18 has been cooled below a predetermined threshold temperature Tth or to such an extent that the quick cooling can be terminated, which is awaited (step A04). That determination is repeatedly performed.

If it is determined that the turn-off command for the power supply is given by the usual power key 32a and not by the quick power off key 32b in step A02, the motor 25 is set to the "medium" rotational speed, thereby performing the usual (non-quick or silent) cooling for the light source 18 (step A05).

Then it is determined based on a sensed temperature of the light source 18 from the temperature sensor 28 in the usual cooled state whether the light source 18 has been cooled below the predetermined threshold temperature Tth or to such an extent that the usual (non-quick or silent) cooling can be terminated, which is awaited (step A06). That determination is repeatedly performed.

When it is determined that the light source 18 has been cooled below the predetermined threshold Tth in step A03 or A05, then it is determined that the quick or usual cooling has been terminated and the cooling operation of the motor 25 or the cooling fan 24 is stopped (step A07). This stops all the operations of the elements of the projector 10 including a display of the indicator 33 and operation of the voice processor 34 involving sound emanation from the speaker 35 (step A08). Thus, the operation of the CPU 29 shown in FIG. 3 is terminated.

As described above, according to the present embodiment, after the image projection of the image projector is terminated the light source is cooled in a cooling capability appropriate for an environment of the projector.

In addition, in the above embodiment one of the quick and usual cooling operations of the light source 18 is selected depending on whether a corresponding one of the quick power off and usual power supply keys 32b and 32a of the key switch unit 32 is depressed by the user. Thus, it is ensured that the user's intention is reflected on his or her operation, thereby avoiding erroneous setting up of the quick cooling, which would produce great noise to hamper questions and answers or discussion about the images projected and presented on the screen.

In the above embodiment, it is illustrated that one of the quick and usual cooling operations is selected depending on a corresponding one of the quick power off and usual power supply keys 32b and 32a being depressed. Alternatively, arrangement may be such that the quick cooling operation is selected depending on a manner in which a particular key is operated, for example when the power supply key 32a is depressed continuously over 2 seconds, even when no dedicated key such as the quick power off key 32b is especially provided in the key switch unit 32.

In the above embodiment, it is illustrated that one of the quick and usual cooling operations is selected depending on a corresponding one of the power off and usual power supply keys 32b and 32a being depressed by the user after the image projection is terminated. Alternatively, only cases in which the light source 18 should be cooled in the usual (non-quick or silent) manner may be set before the start of the image projection without providing the quick power off key 32b in the key switch unit 32 so that when one of the cases is met after the image projection and the power supply is turned off by the power supply key 32a, the light source 18 is cooled in the usual manner. By such arrangement, the usual cooling operation appropriate for the environment of the projector is performed automatically by the same power supply key 32a that is used to turn on the power supply after the image projection event is terminated.

Second Embodiment

A second embodiment of the image projector 10 of a DLP™ type will be described with respect to the drawings. The electronic circuits of this image projector are the same in configuration and function as those of the FIG. 1 first embodiment excluding that no key such as the quick power off key 32b is provided in the key switch unit 32 of FIG. 2. Thus, like parts are denoted by like reference numerals in Figures of the drawings and further description thereof will be omitted.

Figure 4:
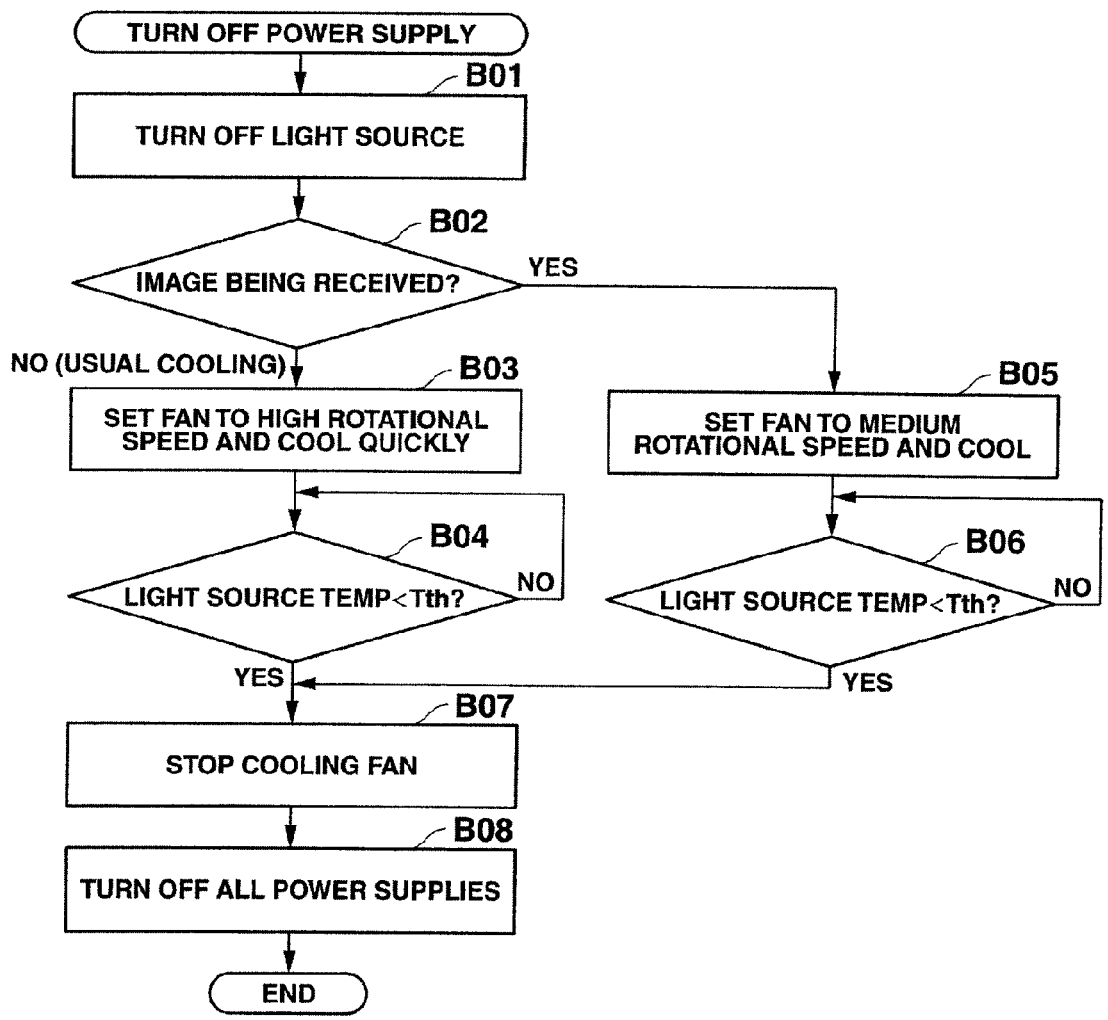
FIG. 4 is a flowchart of operation of the projector to be performed when its power supply is turned off in a second embodiment.

Operation of the embodiment will be described. FIG. 4 is a flowchart of operation of the projector to be performed when a command to turn off the power supply of the projector is given by the power supply key 32a of the key switch unit 32. The CPU 29 causes the projection light processor 27 to perform all this operation based on the operation program stored in the program memory 30.

At the beginning, the light source 18 is turned off (step B01). Then at, this time it is determined whether an image signal is still being received via the input/output connector 11 (step B02).

When it is determined that no image signal is being inputted, it is regarded that the power supply for the external device which is expected to be connected to the input/output connector 11 is already turned off at this time and that there is a high probability that the image projector 10 will be immediately withdrawn. Thus, the motor 25 is set to the highest "high" one of the "high", "medium" and "low" rotational speeds, thereby cooling the light source 18 quickly (step B03).

Then it is determined based on a sensed temperature of the light source 18 from the temperature sensor 28 whether the light source 18 has been cooled below a predetermined threshold temperature Tth or to such an extent that the quick cooling can be terminated, which is awaited (step B04). That determination is repeatedly performed.

If the image signal is still being received by the image projector 10 via the input/output connector 11 in step B02 and the power supply for the external device connected to the input/output connector 11 is on at this time, it is regarded that there is no possibility that the image projector 10 will be immediately withdrawn. Thus the motor 25 is set to the "medium" rotational speed, thereby cooling the light source 18 in a usual a (non-quick or silent) manner (step B05).

Then it is determined based on a sensed temperature of the light source 18 from the temperature sensor 28 in the usual cooled state whether the light source 18 has been cooled below the predetermined threshold temperature Tth or to such an extent that the usual cooling can be terminated, which is awaited (step B06). That determination is repeatedly performed.

When it is determined that the light source 18 has been cooled below the predetermined threshold Tth in step B03 or B05, it is regarded that the quick or usual cooling has been terminated and then the cooling operation of the motor 25 or the cooling fan 24 is stopped (step B07). This stops all the operations of the elements of the projector 10 including a display of the indicator 33 and operation of the voice processor 34 involving sound emanation from the speaker 35 (step B08). Thus, the operation of the CPU 29 shown in FIG. 4 is terminated.

As described above, according to this embodiment only when no image signal is being received, this situation is sensed automatically and then the quick cooling of the light source 18 is performed. As long as the image signal continues to be received by the image projector 18, no quick cooling operation is performed. Thus, it is ensured that a situation is avoided in which questions and answers and discussions which may be had about the presented images would be hampered by noises due to the quick cooling after the power supply is turned off.

Third Embodiment

A third embodiment of the image projector of a DLP™ type will be described with respect to the drawings. The electronic circuits of this image projector also are the same in configuration and function as those of the FIG. 1 first embodiment excluding that no key such as the quick power off key 32b is provided in the key switch unit 32 of FIG. 2. Thus, like parts are denoted by like reference numerals in Figures of the drawings and further description thereof will be omitted.

Figure 5:
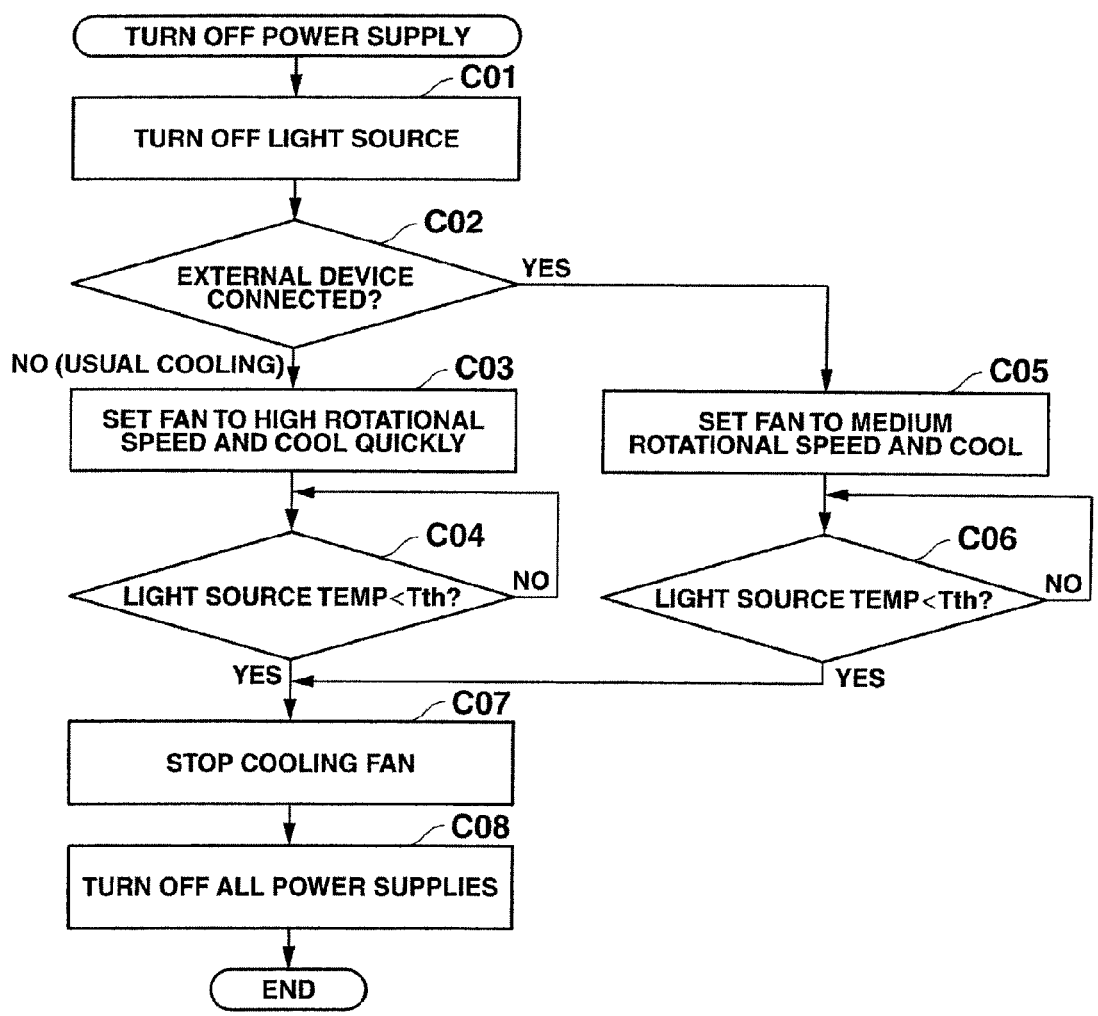
FIG. 5 is a flowchart of operation of the projector to be performed when its power supply is turned off in a third embodiment.

Operation of the embodiment will be described. FIG. 5 is a flowchart of operation of the projector to be performed when a command to turn off the power supply of the projector is given by the power supply key 32a or the quick power off key 32 of the key switch unit 32. This operation is performed by the CPU 29 mainly via the projection light processor 27 based on the operation program stored in the program memory 30.

At the beginning, the lightening operation of the light source 18 is stopped and the light source 18 is turned off (step C01). Then at this time it is determined whether there is an external device connected to the input/output connector 11 (step C02).

This determination is performed based on whether the input terminals of the input/output connector 11 are open, or the external device side impedance as viewed from the input terminals of the input/output, connector 11 is infinite. When it is determined that no external device is connected to the input/output connector 11, then the motor 25 is set to the highest "high" rotational speed, thereby cooling the light source 18 quickly (step C03).

Then it is determined based on a sensed temperature of the light source 18 from the temperature sensor 28 whether the light source 18 has been cooled below a predetermined threshold temperature Tth or to such an extent that the quick cooling can be terminated, which is awaited (step C04). That determination is repeatedly performed.

When it is determined in step C02 that the external device is still connected to the input/output connector 11, then the motor 25 is set to the "medium" rotational speed, thereby cooling the light source 18 in a usual (non-quick or silent) manner. (step C05).

Then it, is determined based on a sensed temperature of the light source 18 from the temperature sensor 28 in the usual cooled state whether the light source 18 has been cooled below the predetermined threshold temperature Tth or to such an extent that the usual cooling operation can be terminated, which is awaited (step C06). That determination is repeatedly performed.

When it is determined that the light source lamp 18 has been cooled below the predetermined threshold Tth in step C03 or C05, it is regarded that the quick or usual cooling has been terminated and then the cooling operation of the motor 25 or the cooling fan 24 is stopped (step C07). This stops all the operations of the elements of the projector 10 including a display of the indicator 33 and operation of the voice processor 34 involving sound emanation from the speaker 35 (step C08). Thus, the operation of the CPU 29 shown in FIG. 5 is terminated.

As described above, according to this embodiment, when the power supply is turned off, whether the quick cooling operation of the light source 18 should be performed is determined based on whether the external device is not connected to the input/output connector 11. Thus, when the external device is completely disconnected from the connector 11, this situation is determined automatically and the quick cooling operation is started. As long as the external device is still connected to the input/output connector 11, no quick cooling operation is performed. Thus, it is ensured that a situation is avoided in which questions and answers and discussions about the presented images would be hampered by noises due to the quick cooling.

In this embodiment, whether the input terminals of the connector are open is illustrated as determined based on whether the external device side impedance as viewed from the input terminals of the input/output connector 11 is infinite. Alternatively, any well-known appropriate electric or mechanical detector may be used to determine whether an external device is connected to the input/output connector 11.

While in any of the first-third embodiments the termination of the quick or usual cooling operation is illustrated as determined depending on whether the light source 18 has been below a predetermined threshold temperature Tth, arrangement may be such that a timer (not shown) provided in the CPU 29 counts a predetermined time set for the (quick or usual cooling operation to determine the termination of that cooling operation without using the temperature sensor 28 which senses the temperature of the light source 18.

While in any of the above first-third embodiments the present invention is illustrated as applied to the image projectors 10 of a DLP™, the present invention is not limited to such projectors, but applicable to any image projectors such as ones of a liquid crystal display type in which images are projected onto a transparent color liquid display panel as a display, monochromatic OHPs (Overhead Projectors) and slide projectors, in which the light source is required to be cooled after the image projection is terminated.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-162611 filed on Jun. 20, 2007 and including specification, claims, drawings and summary. The disclosure of the above Japanese patent application is incorporated herein by reference in its entirety.

What is claimed is:

1. An image projector apparatus comprising:
    a light source comprising a lamp;
    a projector subunit that produces an optical image based on an image signal inputted from outside of the apparatus and light from the light source and projects the optical image;
    a cooler having a variable capability to cool the lamp of the light source;
    commanding means for giving a command to terminate a lighting operation of the lamp;
    detecting means for detecting a connection state of a connector to which a signal is inputted from outside;
    selecting means for, responsive to a result of detection by the detecting means at a time of giving the command by the commanding means, selecting a cooling capability of the cooler; and
    control means for causing the cooler to cool the lamp of the light source with the cooling capability selected by the selecting means.

2. The image projector apparatus of claim 1, wherein the selecting means selects a highest cooling capability of the cooler, in a case in which the detecting means detects that an external device is not connected to the connector.

3. The image projector apparatus of claim 1, wherein the selecting means selects a cooling capability other than a highest cooling capability of the cooler, in a case in which the detecting means detects that there is an external device connected to the connector.

4. A method of controlling operation of an image projector apparatus including a light source comprising a lamp, a projector subunit that produces an optical image based on an image signal inputted from outside of the apparatus and light from the light source and projects the optical image, and a cooler having a variable cooling capability to cool the lamp of the light source, the method comprising:
    giving a command to terminate a lighting operation of the lamp of the apparatus;
    detecting a connection state of a connector to which a signal is inputted from outside;
    responsive to a result of the detecting at a time of giving the command to terminate the lighting operation, selecting a cooling capability of the cooler; and
    causing the cooler to cool the lamp of the light source with the selected cooling capability.

5. A non-transitory computer-readable recording medium having a program stored thereon that is executable by a computer in an image projector apparatus including a light source comprising a lamp, a projector subunit that produces an optical image based on an image signal inputted from outside of the apparatus and light from the light source and projects the optical image, and a cooler having a variable cooling capability to cool the lamp of the light source, the program being executable by the computer to control the apparatus to perform a process comprising:
    giving a command to terminate a lighting operation of the lamp of the apparatus;
    detecting a connection state of a connector to which a signal is inputted from outside;
    responsive to a result of the detecting at a time of giving the command to terminate the lighting operation, selecting a cooling capability of the cooler; and
    causing the cooler to cool the lamp of the light source with the selected cooling capability.

* * * * *